United States Patent
Zhao et al.

(10) Patent No.: US 11,738,604 B2
(45) Date of Patent: Aug. 29, 2023

(54) SENSOR RETAINING SYSTEM FOR VEHICLE TIRE

(71) Applicant: The Goodyear Tire & Rubber Company, Akron, OH (US)

(72) Inventors: Junling Zhao, Hudson, OH (US); Peter Jung-min Suh, Stow, OH (US); Jeffrey McKay West, Uniontown, OH (US); Arun Kumar Byatarayanapura Gopala, Copley, OH (US); Michael William Kestner, Canton, OH (US); Andrew Peter Killmeyer, Macedonia, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 5 days.

(21) Appl. No.: 17/502,077

(22) Filed: Oct. 15, 2021

(65) Prior Publication Data

US 2022/0185031 A1   Jun. 16, 2022

Related U.S. Application Data

(60) Provisional application No. 63/125,447, filed on Dec. 15, 2020.

(51) Int. Cl.
*B60C 11/24* (2006.01)
*B60C 19/00* (2006.01)

(52) U.S. Cl.
CPC .......... *B60C 11/243* (2013.01); *B60C 11/246* (2013.01); *B60C 2019/004* (2013.01)

(58) Field of Classification Search
CPC ................ B60C 11/243; B60C 11/246; B60C 2019/004; B60C 23/0493;
(Continued)

(56) References Cited

U.S. PATENT DOCUMENTS 6,443,198 B1   9/2002   Koch et al.
6,444,069 B1   9/2002   Koch et al.
(Continued)

FOREIGN PATENT DOCUMENTS

DE   19745734 A1   4/1999
DE   20216290 U1   1/2003
(Continued)

OTHER PUBLICATIONS

Search Report for corresponding European application received by Applicant dated May 19, 2022.

*Primary Examiner* — Harshad R Patel
*Assistant Examiner* — Gedeon M Kidanu
(74) *Attorney, Agent, or Firm* — Edward T. Kennedy (57) ABSTRACT

A sensor retaining system for a vehicle tire is provided. The tire includes a pair of sidewalls extending from a respective bead area to a tread, which is formed with a plurality of tread elements. A sensor unit is mounted to the tire and includes a pair of electrical contacts. A tread wear sensor extends into one of the tread elements and includes a wire. The wire includes proximal ends, each one of which contacts a sensor unit electrical contact to create an electrical circuit. A flexible container is mounted to an innerliner of the tire. A cup includes a base and a sidewall that cooperate to form a cavity, and a bottom of the tread wear sensor and the sensor unit are received in the cavity. The cup maintains a connection between the electrical contacts and the wire proximal ends, and is disposed in the flexible container.

13 Claims, 5 Drawing Sheets

(58) Field of Classification Search
CPC ....... B29D 2030/0083; B29D 30/0061; G01M 17/02; G01L 17/00
See application file for complete search history.

(56) References Cited

U.S. PATENT DOCUMENTS

| | | |
|---|---|---|
| 6,546,982 B1 | 4/2003 | Brown et al. |
| 6,885,291 B1 | 4/2005 | Pollack et al. |
| 6,889,153 B2 | 5/2005 | Dietiker |
| 7,280,036 B2 | 10/2007 | Kafrawy |
| 8,596,117 B2 | 12/2013 | Wilson et al. |
| 9,016,118 B2 | 4/2015 | Townsend et al. |
| 9,283,817 B2 | 3/2016 | Sandstrom et al. |
| 9,352,615 B2 | 5/2016 | Djelloul-Mazouz et al. |
| 9,476,789 B2 * | 10/2016 | Champredonde ... B60C 23/0493 |
| 9,649,889 B2 * | 5/2017 | Engel ...................... G01S 1/022 |
| 2004/0118196 A1* | 6/2004 | Landes ............... B60C 23/0493 73/146 |
| 2005/0044943 A1* | 3/2005 | Godeau ................... G01N 3/56 73/146 |
| 2019/0184773 A1 | 6/2019 | Saito |
| 2021/0053402 A1* | 2/2021 | Boisset ................ G01M 17/02 |

FOREIGN PATENT DOCUMENTS

| | | |
|---|---|---|
| DE | 102007001279 A1 | 7/2008 |
| DE | 102010000003 A1 | 7/2011 |
| JP | 2005-028950 A | 2/2005 |
| KR | 102124829 B1 | 6/2020 |
| KR | 20210102008 A * | 8/2021 |

\* cited by examiner

SENSOR RETAINING SYSTEM FOR VEHICLE TIRE

FIELD OF THE INVENTION

The invention relates to vehicle tires. More particularly, the invention relates to vehicle tires with sensors that determine various conditions within the tires. Specifically, the invention is directed to a sensor retaining system for a tire, which includes a reinforcing cup for the sensor, which in turn is disposed in a flexible container.

BACKGROUND OF THE INVENTION

In the manufacture of a pneumatic tire, the tire is typically built on the drum of a tire-building machine, which is known in the art as a tire building drum. Numerous tire components are wrapped about and/or applied to the drum in sequence, forming a cylindrical-shaped tire carcass. The tire carcass is then expanded into a toroidal shape for receipt of the remaining components of the tire, such as a belt package and a rubber tread. The completed toroidally-shaped unvulcanized tire carcass, which is known in the art at that stage as a green tire, is then inserted into a mold or press for forming of the tread pattern and curing or vulcanization.

The use of tread wear indicators that are formed on a tire tread before or after curing is known in the art. For example, prior art mechanical tread wear indicators include color indicia disposed below certain tread elements, tie bars disposed in the tread grooves, or characters formed in the tread elements, all of which provide a visual indicator of wear. Such mechanical indicators may be difficult for a vehicle operator to see, and thus do not easily provide information to the operator.

In addition, it is often desirable to collect electronic data for the wear state of the tire. The data can be communicated to electronic systems of the vehicle, such as vehicle stability and/or braking systems, in order to provide improved control of the vehicle and to monitor or track driving behavior. Mechanical tread wear indicators are not able to provide such data to electronic systems of the vehicle.

To provide an indication of tire wear to vehicle electronic systems, prior art indirect wear estimation techniques were developed. Such techniques involve estimation of tire wear through certain tire and vehicle parameters, rather than direct measurement of wear. For example, tire pressure, tire temperature, vehicle speed, vehicle mileage, vehicle acceleration and other parameters may be employed to estimate tire wear. Such indirect estimation of tire wear can be difficult to perform accurately, and typically involves complex modeling techniques.

In order to provide a wear indication to vehicle electronic systems based on a direct measurement of tire wear, prior art electronic wear sensors were developed. Such sensors are known in the art as direct wear sensors, as they attempt to directly measure tire wear, rather than providing an estimate from indirect means. By way of example, prior art direct wear sensors include resistance-based electronic sensors that typically are incorporated into tread elements of tires. As the tread element wears, resistors in the sensor also wear, leading to a change in the electrical resistance of the sensor. By measuring the resistance of the sensor and transmitting the measured resistance data to a processor, wear of the tread can be determined.

In addition to an electronic tread wear sensors, some tires include a sensor for a tire pressure monitoring system (TPMS), which enables the pressure inside the tire to be monitored. A TPMS sensor may be mounted to an innerliner of the tire using a flexible housing or container to withstand the dynamic environment of the tire. When an electronic tread wear sensor is employed, it may be desirable for the electronic tread wear sensor to be in electrical contact with the TPMS sensor.

It has been determined that the flexible container for the TPMS sensor may not provide sufficient compression or holding force on the TPMS sensor to maintain electrical contact between the electronic tread wear sensor and the TPMS sensor over time. In addition, the flexible container for the TPMS sensor may allow relative movement between the electronic tread wear sensor and the TPMS sensor, abrading the electrical contacts on the electronic tread wear sensor and/or the TPMS sensor. When such abrasion occurs, the electrical contacts on the electronic tread wear sensor and/or the TPMS sensor wear down, undesirably reducing the electrical conductivity between the electronic tread wear sensor and the TPMS sensor.

As a result, it is desirable to develop a sensor retaining system for a vehicle tire that includes a structure which provides sufficient compression to maintain electrical contact between an electronic tread wear sensor and a TPMS sensor, reduces relative movement between the electronic tread wear sensor and the TPMS sensor, is durable, and is easy to install.

SUMMARY OF THE INVENTION

According to an aspect of an exemplary embodiment of the invention, a sensor retaining system for a vehicle tire is provided. The tire includes a pair of sidewalls, each one of which extends radially outwardly from a respective bead area to a ground-contacting tread. The tread is formed with a plurality of tread elements. A sensor unit is mounted to the tire, and includes a pair of electrical contacts. A tread wear sensor extends into a selected one of the tread elements. The tread wear sensor includes a wire that includes proximal ends, each one of which electrically contacts a respective one of the sensor unit electrical contacts to create an electrical circuit. A flexible container is mounted to an innerliner of the tire. A cup includes a base and a sidewall that cooperate to form a cavity. A bottom of the tread wear sensor and the sensor unit are received in the cavity of the cup, in which the cup maintains a connection between the electrical contacts and the wire proximal ends, and the cup is disposed in the flexible container.

Definitions

"Axial" and "axially" mean lines or directions that are parallel to the axis of rotation of the tire.

"Axially inward" and "axially inwardly" refer to an axial direction that is toward the axial center of the tire.

"Axially outward" and "axially outwardly" refer to an axial direction that is away from the axial center of the tire.

"Bead" means that part of the tire comprising an annular tensile member wrapped by ply cords and shaped, with or without other reinforcement elements such as flippers, chippers, apexes, toe guards and chafers, to fit the design rim.

"CAN bus" is an abbreviation for controller area network.

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Equatorial plane (EP)" means the plane perpendicular to the tire's axis of rotation and passing through the center of its tread.

"Footprint" means the contact patch or area of contact created by the tire tread with a flat surface, such as the ground, as the tire rotates or rolls.

"Inboard side" means the side of the tire nearest the vehicle when the tire is mounted on a wheel and the wheel is mounted on the vehicle.

"Innerliner" means the layer or layers of elastomer or other material that form the inside surface of a tubeless tire and that contain the inflating fluid within the tire.

"Lateral" means an axial direction.

"Lateral edges" means a line tangent to the axially outermost tread contact patch or footprint as measured under normal load and tire inflation, the lines being parallel to the equatorial centerplane.

"Outboard side" means the side of the tire farthest away from the vehicle when the tire is mounted on a wheel and the wheel is mounted on the vehicle.

"Radial" and "radially" mean lines or directions that are perpendicular to the axis of rotation of the tire.

"Radially inward" and "radially inwardly" refer to a radial direction that is toward the central axis of rotation of the tire.

"Radially outward" and "radially outwardly" refer to a radial direction that is away from the central axis of rotation of the tire.

"TPMS" means a tire pressure monitoring system, which is an electronic system that measures the internal pressure of a tire and is capable of communicating the pressure to a processor that is mounted on the vehicle and/or is in electronic communication with electronic systems of the vehicle.

"Tread element" or "traction element" means a rib or a block element defined by a shape having adjacent grooves.

BRIEF DESCRIPTION OF DRAWINGS

The invention will be described by way of example and with reference to the accompanying drawings, in which.

Similar numerals refer to similar parts throughout the drawings.

DETAILED DESCRIPTION OF THE INVENTION

Figure 1:
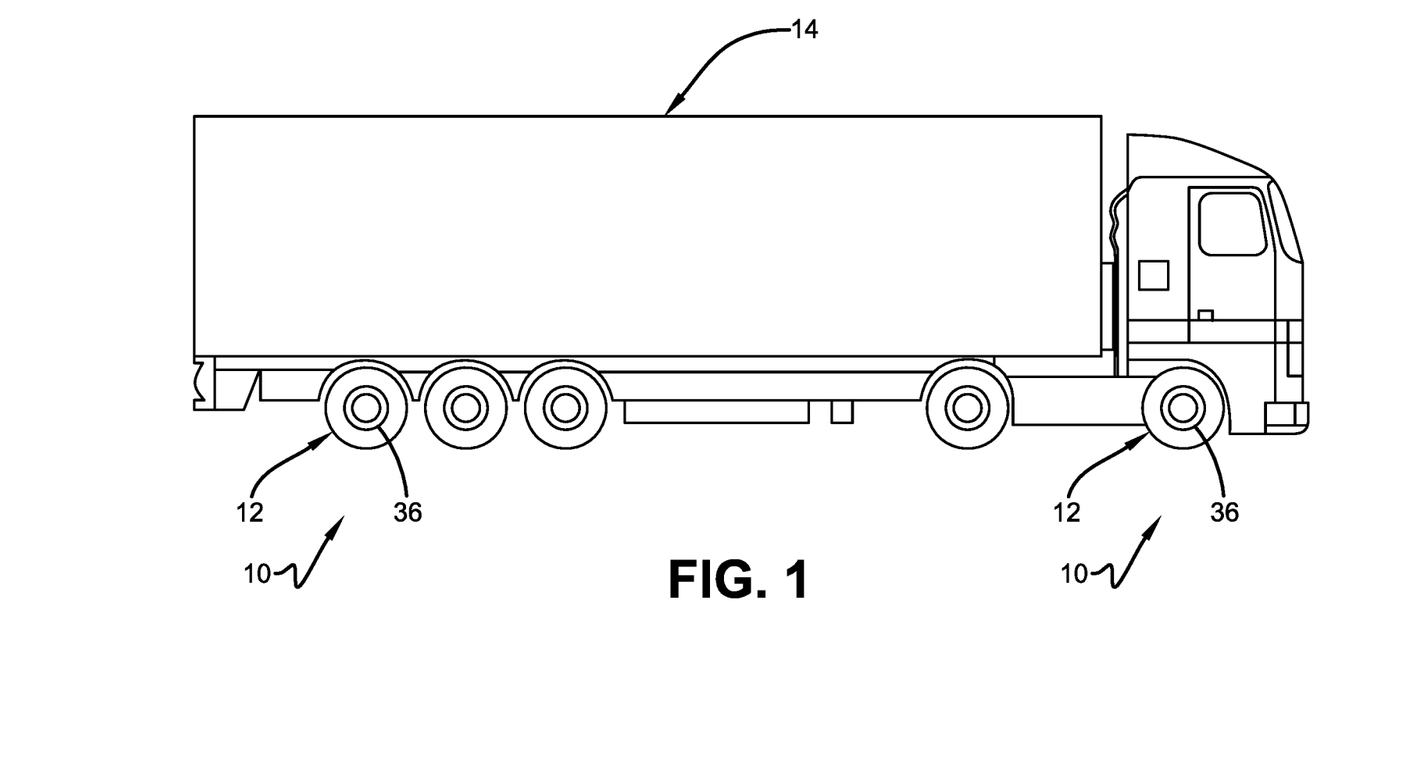
FIG. 1 is a schematic side view of a vehicle with tires that include an exemplary embodiment of the sensor retaining system for a vehicle tire of the present invention.

An exemplary embodiment of the sensor retaining system for a vehicle tire of the present invention is indicated at 10 in FIGS. 1 through 8D. With particular reference to FIG. 1, one or more tires 12 supports a vehicle 14. While the vehicle 14 is depicted as a commercial truck, the invention is not to be so restricted. The principles of the invention find application in other vehicle categories, such as passenger vehicles, off-the-road vehicles and the like, in which vehicles may be supported by more or fewer tires than shown in FIG. 1.

Figure 2:
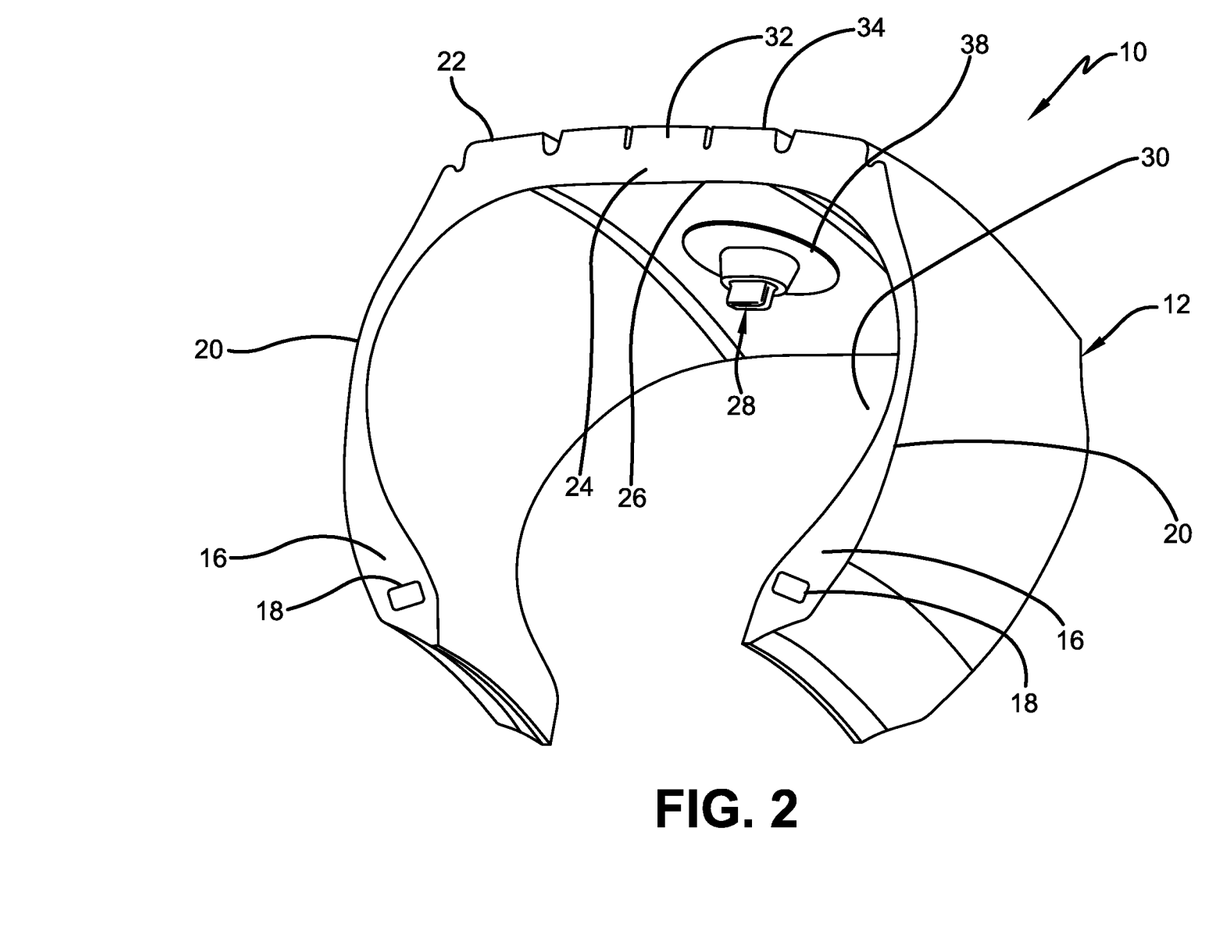
FIG. 2 is a perspective cross-sectional view of a tire shown in FIG. 1.

Turning to FIG. 2, the tire 12 includes a pair of bead areas 16, each one of which is formed with a bead core 18 that is embedded in the respective bead areas. Each one of a pair of sidewalls 20 extends radially outwardly from a respective bead area 16 to a ground-contacting tread 22. The tread 22 is formed with multiple tread elements or tread blocks 32 and includes a radially outer surface 34. The tire 12 is reinforced by a carcass 24 that toroidally extends from one bead area 16 to the other bead area, as known to those skilled in the art. An innerliner 26 is formed on the inner or inside surface of the carcass 24. The tire 12 is mounted on the flange of a wheel or rim 36 (FIG. 1) as known in the art, forming an internal cavity 30.

A sensor unit 28 is mounted to the tire 12. The sensor unit 28 detects certain real-time parameters of the tire 12, and preferably includes a pressure sensor to sense the inflation pressure within a cavity 30 of the tire, and a temperature sensor to sense the temperature of the tire and/or the temperature in the cavity. The sensor unit 28 preferably is a commercially-available tire pressure monitoring system (TPMS) module or sensing unit.

The sensor unit 28 preferably also includes a processor and memory to store tire identification (ID) information for each specific tire 12. For example, the tire ID may include manufacturing information for the tire 12, including: the tire model; size information, such as rim size, width, and outer diameter; manufacturing location; manufacturing date; a treadcap code that includes or correlates to a compound identification; and a mold code that includes or correlates to a tread structure identification. The tire ID may also include a service history or other information to identify specific features and parameters of each tire 12.

The sensor unit 28 preferably further includes an antenna for wirelessly transmitting measured parameters and tire ID data to a remote processor for analysis, such as a processor integrated into a vehicle electronic control unit and/or CAN bus.

Figure 3:
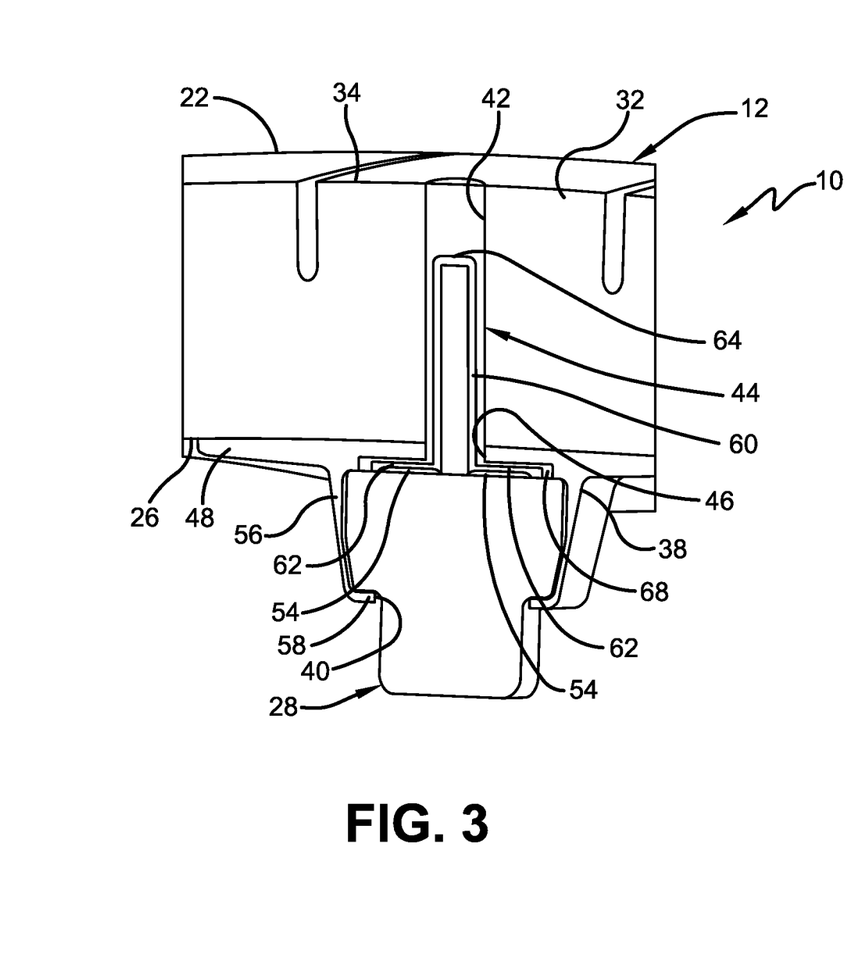
FIG. 3 is a schematic cross-sectional view of a portion of a tire with a TPMS sensor and a tread wear sensor without the sensor retaining system for a vehicle tire.

Turning to FIG. 3, the sensor unit 28 preferably is mounted to the tire 12 using a container 38, which receives the sensor unit and is attached to the innerliner 26 by an adhesive. Preferably, the container 38 is flexible and is formed of an elastomer or polymer. The sensor unit 28 is inserted into the container 38 through a sensor unit opening 40. Because the container 38 is formed of a flexible material, a wall 56 and lip 58 flex to allow insertion of the sensor unit 28, and then secure the sensor unit in the container.

Figure 4:
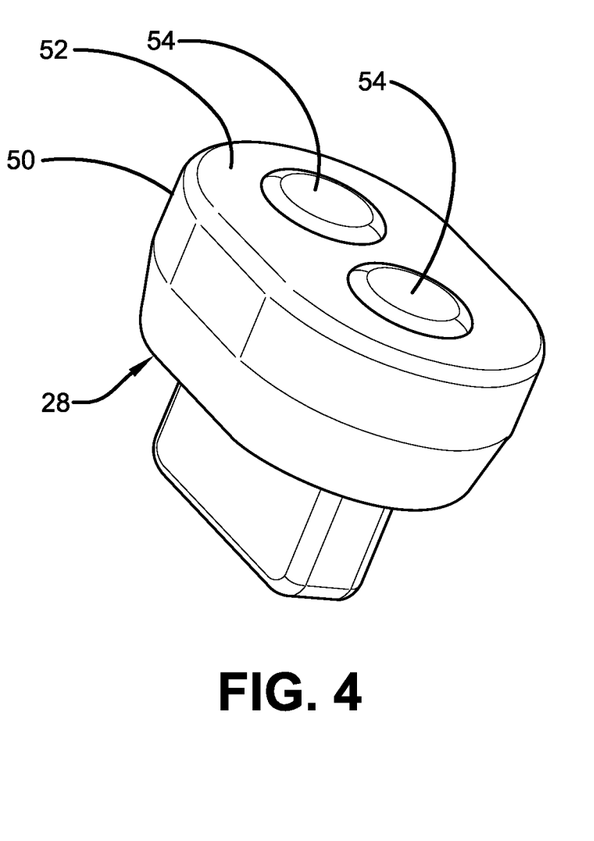
FIG. 4 is a perspective view of a TPMS sensor employed in the exemplary embodiment of the sensor retaining system for a vehicle tire.

As shown in FIG. 4, the sensor unit 28 includes a rigid housing 50 formed with a base 52. A pair of electrical contacts 54 are mounted on the base 52 and extend through the housing 50.

Returning to FIG. 3, a tread wear sensor 44 is disposed in an opening 42 that is formed in a selected tread element 32. An opening 46 is formed in a base 48 of the container 38, which aligns with the opening 42 to allow the tread wear sensor 44 to seat in the selected tread element 32 and extend into the container. A conductive wire 60 is disposed in the tread wear sensor 44. The wire 60 preferably is an insulated wire, but may be an uninsulated wire, depending on particular design considerations. The wire is formed in a U-shape and thus has proximal ends 62 and a distal end 64. The proximal ends 62 of the wire 60 extend to a bottom 68 of the tread wear sensor 44 to contact the electrical contacts 54 of the sensor unit 28.

A continuous electrical circuit is formed by the wire 60 and the contact of each proximal wire end 62 with each respective electrical contact 54 of the sensor unit 28. As the tread 22 wears, the tread wear sensor 44 also wears. When the tread 22 and the tread wear sensor 44 wear down to the wire 60, the distal end 64 of the wire 60 breaks, creating a break in the electrical circuit formed by the wire and the contact of each proximal wire end 62 with each respective sensor unit electrical contact 54. The sensor unit 28 senses the break in the electrical circuit, and wirelessly transmits a notice that the electrical circuit has broken and/or that the minimum recommended tread depth has been reached.

It has been determined that the container 38 may not provide sufficient compression or holding force on the sensor unit 28 to maintain electrical contact between the tread wear sensor 44 and the sensor unit. In addition, the container 38 may allow excessive relative movement between the tread wear sensor 44 and the sensor unit 28, abrading the sensor unit electric contacts 54 and/or the tread wear sensor wire proximal ends 62. The sensor retaining system for a vehicle tire of the present invention 10 overcomes these disadvantages.

Figure 5:
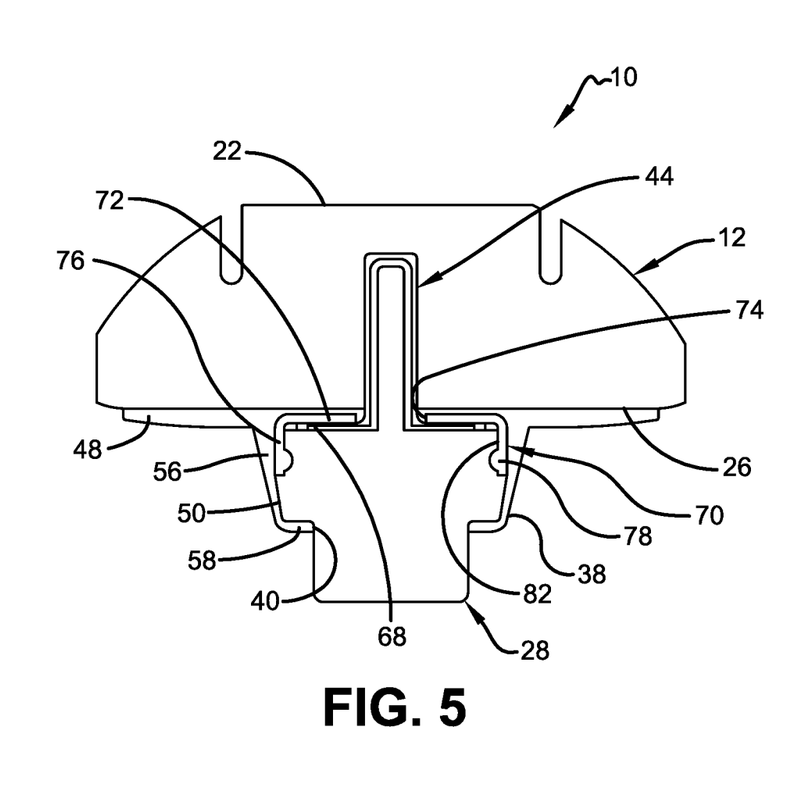
FIG. 5 is a schematic cross-sectional view of the tire shown in FIG. 2, with the sensor retaining system for a vehicle tire of the present invention.
Figure 6:
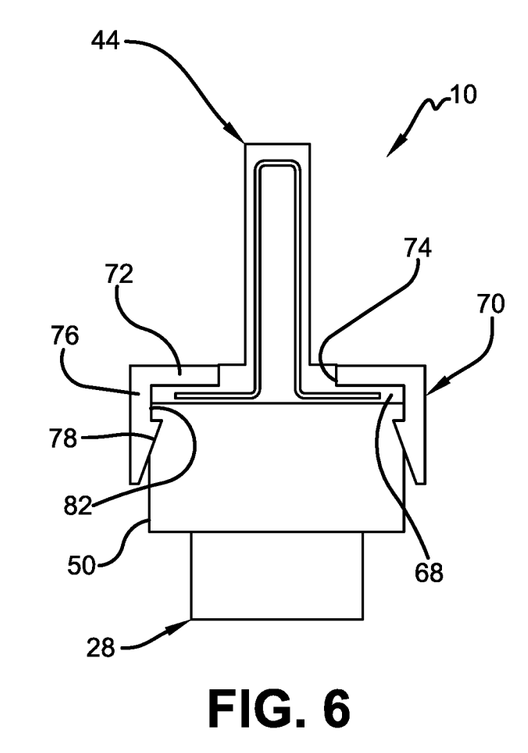
FIG. 6 is a schematic cross-sectional view of selected components of the sensor retaining system for a vehicle tire of the present invention shown in FIG. 5.
Figure 7A:
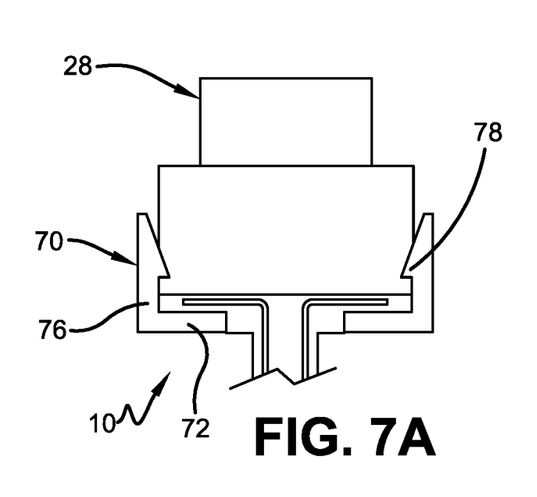
FIG. 7A is a schematic cross-sectional view of a selected portion of the component shown in FIG. 6.
Figure 7B:
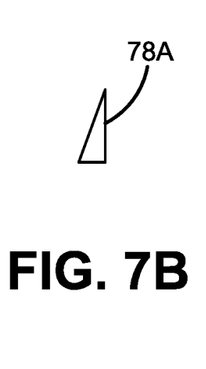
FIG. 7B is a schematic representation of an alternative feature of the sensor retaining system for a vehicle tire of the present invention.
Figure 7C:
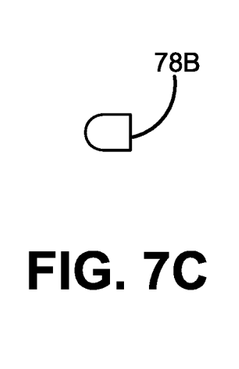
FIG. 7C is a schematic representation of an alternative feature of the sensor retaining system for a vehicle tire of the present invention.
Figure 7D:
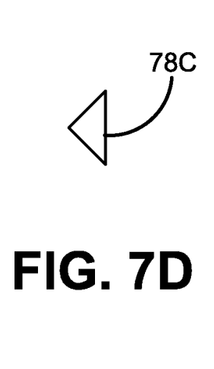
FIG. 7D is a schematic representation of an alternative feature of the sensor retaining system for a vehicle tire of the present invention.

Turning to FIGS. 5 and 6, the sensor retaining system 10 includes a cup 70. The cup 70 includes a base 72, which is formed with a central opening 74. The cup 70 also includes a sidewall 76 that extends radially from the base 72. The base 72 and the sidewall 76 cooperate to form a cup cavity 82.

The central opening 74 in the base 72 aligns with the opening 46 formed in the container 38 and the opening 42 in the selected tread element 32. The tread wear sensor 44 extends through the central opening 74 in the base 72, through the container opening 46 and into the selected tread element opening 42. The bottom 68 of the tread wear sensor 44 and thus the proximal ends 62 of the wire 60 remain in the cup cavity 82. The sensor unit 28 is received and seats in the cup cavity 82, thereby ensuring that the electrical contacts 54 engage the proximal ends 62 of the wire 60. The cup 70 is formed of a rigid or semi-rigid material that exhibits compliance for compression, such as a plastic, elastomer, thermoplastic elastomer, or a metal. In this manner, the sidewall 76 of the cup 70 creates mechanical compression on the housing 50 of the sensor unit 28 to maintain a secure connection between the electrical contacts 54 and the proximal ends 62 of the wire 60.

Once the tread wear sensor 44 and the sensor unit 28 are inserted into the cup 70, the cup is inserted into the flexible container 38. More particularly, because the container 38 is formed of a flexible material, the wall 56 and lip 58 flex to allow insertion of the cup 70 with the tread wear sensor 44 and the sensor unit 28 through the opening 40. Once the cup 70 is inserted into the container 38, the wall 56 and lip 58 engage the cup and the sensor unit 28 to secure them in the container. Thus, the tread wear sensor 44 and the sensor unit 28 are secured together by the cup 70, which is received and contained in the container 38 and affixed to the tire innerliner 26.

Preferably, to increase the mechanical compression of the plug sidewall 76 on the sensor unit housing 50, the sidewall may be formed with an inwardly-extending flange feature 78. As shown in FIGS. 7A through 7D, the flange feature 78 may include any suitable cross section, such as a right-triangle cross section 78A, a semi-circular cross section 78B, or an isosceles triangle cross section 78C.

Figure 8A:
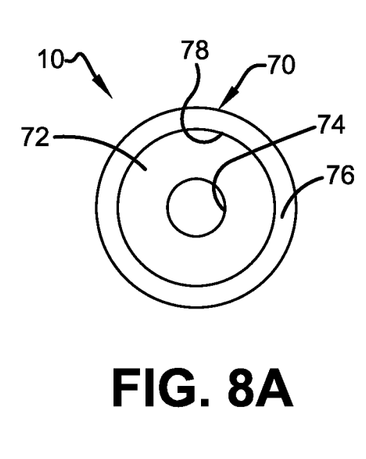
FIG. 8A is a schematic plan view of an exemplary configuration of a portion of the sensor retaining system for a vehicle tire of the present invention.
Figure 8B:
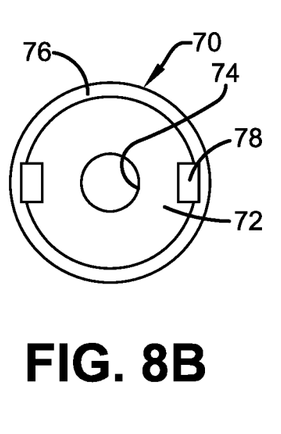
FIG. 8B is a schematic plan view of an alternative configuration of a portion of the sensor retaining system for a vehicle tire of the present invention.
Figure 8C:
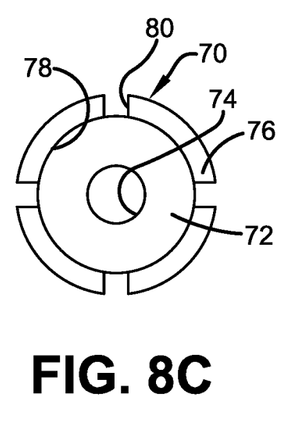
FIG. 8C is a schematic plan view of an alternative configuration of a portion of the sensor retaining system for a vehicle tire of the present invention.
Figure 8D:
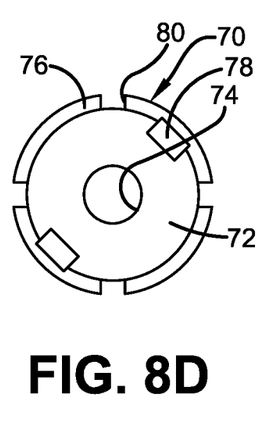
FIG. 8D is a schematic plan view of an alternative configuration of a portion of the sensor retaining system for a vehicle tire of the present invention.

The sidewall 76 of the plug 70 may be adapted based on particular design considerations to provide optimum compression on the sensor plug 26. For example, as shown in FIG. 8A, the sidewall 76 may be a solid sidewall with a continuous flange feature 78. As shown in FIG. 8B, the sidewall 76 may be a solid wall with multiple discrete flange features 78. As shown in FIG. 8C, the sidewall 76 may be formed with a continuous flange feature 78 and one or more radially-extending slots 80, which provide compliance of the sidewall to grip the housing 50 of the sensor unit 28. When the sidewall 76 is formed with radially-extending slots 80, preferably, four (4) slots are formed. As shown in FIG. 8D, the sidewall 76 may be formed with multiple discrete flange features 78, and one or more slots 80.

In this manner, the sensor retaining system for a vehicle tire 10 includes a plug 70 that provides a mechanical interlock to create a compression force on the sensor unit 28 and the tread wear sensor 44. The sensor retaining system 10 thus provides compression to maintain electrical contact between the sensor unit 28 and the tread wear sensor 44, and to reduce relative movement between the sensor unit and the tread wear sensor. In addition, the sensor retaining system 10 is durable and easy to install.

The present invention also includes a method of forming a tire with a sensor retaining system 10. The method includes steps in accordance with the description that is presented above and shown in FIGS. 1 through 8D.

It is to be understood that the structure of the above-described sensor retaining system for a vehicle tire 10 may be altered or rearranged, or components or steps known to those skilled in the art omitted or added, without affecting the overall concept or operation of the invention. For example, the container 38 and the cup 70 may be discrete units, or may be incorporated into a single integrated unit, without affecting the overall concept or operation of the invention.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A sensor retaining system for a vehicle tire, comprising:
   the tire including:
      a pair of sidewalls, each one of which extends radially outwardly from a respective bead area to a ground-contacting tread; and
      the tread being formed with a plurality of tread elements;
   a sensor unit being mounted to the tire, the sensor unit including a pair of electrical contacts;
   a tread wear sensor, the tread wear sensor extending into a selected one of the tread elements;
   the tread wear sensor including a wire, the wire including proximal ends, each one of the proximal ends electrically contacting a respective one of the sensor unit electrical contacts to create an electrical circuit;
   a flexible container being mounted to an innerliner of the tire;
   a cup, the cup including a base and a sidewall that cooperate to form a cavity;
   a bottom of the tread wear sensor and the sensor unit being received in the cavity of the cup, wherein the cup maintains a connection between the electrical contacts and the wire proximal ends, the cup sidewall being formed with an inwardly-extending flange feature that directly contacts the sensor unit; and
   the cup being disposed in the flexible container.

2. The sensor retaining system for the vehicle tire of claim 1, wherein the container is formed with a sensor unit opening for removable mounting of the cup and the sensor unit.

3. The sensor retaining system for the vehicle tire of claim 1, wherein the container includes a wall and a lip which flex to allow insertion of the cup and the sensor unit.

4. The sensor retaining system for the vehicle tire of claim 3, wherein the wall and the lip of the container engage the cup and the sensor unit to secure the cup and the sensor unit in the container.

5. The sensor retaining system for the vehicle tire of claim 1, wherein the cup includes a base formed with a central opening, the central opening aligning with an opening formed in a base of the container and an opening formed in the selected one of the tread elements.

6. The sensor retaining system for the vehicle tire of claim 1, wherein the tread wear sensor extends through the central opening in the base of the cup, through the opening formed in the base of the container, and into the selected one of the tread element openings.

7. The sensor retaining system for the vehicle tire of claim 1, wherein the cup is formed of at least one of a plastic, an elastomer, a thermoplastic elastomer, and a metal.

8. The sensor retaining system for the vehicle tire of claim 1, wherein the flange feature is a continuous flange feature.

9. The sensor retaining system for the vehicle tire of claim 1, wherein the flange feature includes multiple discrete flange features.

10. The sensor retaining system for the vehicle tire of claim 1, wherein the flange feature includes at least one of a right-triangle cross section, a semi-circular cross section, and an isosceles-triangle cross section.

11. The sensor retaining system for the vehicle tire of claim 1, wherein the sidewall is a solid sidewall.

12. The sensor retaining system for the vehicle tire of claim 1, wherein the sidewall is formed with at least one radially-extending slot.

13. The sensor retaining system for the vehicle tire of claim 1, wherein the flexible container and the cup are incorporated into a single integrated unit.

* * * * *